US012613502B2

(12) United States Patent
Weilbach et al.

(10) Patent No.: US 12,613,502 B2
(45) Date of Patent: Apr. 28, 2026

(54) SYSTEM AND METHOD FOR REAL-TIME MODEL-BASED CLOSE-LOOP CONTROL FUNCTION MODIFICATION IN TECHNICAL PROCESSES OF A VEHICLE CONTROL SYSTEM OR MANUFACTURING PLANT

(71) Applicant: Robert Bosch GmbH, Stuttgart (DE)

(72) Inventors: Juliane Weilbach, Sindelfingen (DE); Sebastian Gerwinn, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 432 days.

(21) Appl. No.: 18/295,030

(22) Filed: Apr. 3, 2023

(65) Prior Publication Data

US 2023/0341826 A1 Oct. 26, 2023

(30) Foreign Application Priority Data

Apr. 5, 2022 (DE) ..................... 10 2022 203 370.1

(51) Int. Cl.
G05B 13/04 (2006.01)

(52) U.S. Cl.
CPC ......... G05B 13/041 (2013.01); G05B 13/042 (2013.01)

(58) Field of Classification Search
CPC ............... G05B 13/041; G05B 13/042; B60W 2050/0028; B60W 2050/0037; B60W 2050/0088; B60W 30/12; B60W 50/0098; B60W 50/0205; B60W 50/032; G06N 20/10; G06F 17/18; G06F 30/27
USPC .......................................................... 700/29
See application file for complete search history.

(56) References Cited

U.S. PATENT DOCUMENTS

2020/0103878 A1* 4/2020 SayyarRodsari .... G05B 13/042
2023/0029904 A1* 2/2023 Mettenleiter ........... G06F 30/13

FOREIGN PATENT DOCUMENTS

DE 102006059829 A1 6/2008

OTHER PUBLICATIONS

Karimi et al. "Algothrithmic recourse under imperfect causal knowledge: a probabilistic approach," arXiv (2020).

* cited by examiner

*Primary Examiner* — Jigneshkumar C Patel
(74) *Attorney, Agent, or Firm* — NORTON ROSE FULBRIGHT US LLP

(57) ABSTRACT

A device and method for analyzing a technical system or process that includes a first function and a second function. A first model models a functional relationship of input and output variables of the first function and an influence of a first disturbance variable. The second model models a functional relationship of input and output variables of the second function and an influence of a second disturbance variable. An observation is provided that includes input variables and output variables of the first function and of the second function. A prediction regarding an effect of changing the first function under the influence of the first disturbance variable and/or changing the second function under the influence of the second disturbance variable is determined, and of these functions, that function whose change has a higher likelihood of achieving a desired effect is selected.

10 Claims, 3 Drawing Sheets

102          110  100                    106

108

114

104          112

110 train models for both functions — 202 carry out measurement — 204 determine noise posterior — 206 counter factual analysis — 208 determine which function
                                        has greater likelihood of
                                        improving quality of result

— 210 change selected function — 212

506    500 processor(s) 502 interface(s)

memory(ies) 504

SYSTEM AND METHOD FOR REAL-TIME MODEL-BASED CLOSE-LOOP CONTROL FUNCTION MODIFICATION IN TECHNICAL PROCESSES OF A VEHICLE CONTROL SYSTEM OR MANUFACTURING PLANT

FIELD

The present invention is directed to a device and to a method for changing a technical system or a technical process.

The technical system or the technical process may be changed via an algorithmic recourse, in which an explanation in the form of a recommended change is determined, the change resulting in an improved result for a determined observation of the technical system or of the technical process.

BACKGROUND INFORMATION

Karimi, A.-H., Kügelgen, J. v., Schölkopf, B., & Valera, I. (2020), "Algorithmic recourse under imperfect causal knowledge: a probabilistic approach," NeurIPS, (p. 23). Vancouver, Canada (https://arxiv.org/pdf/2006.06831.pdf) (Karimi et al.), describes one example of such an algorithmic recourse.

SUMMARY

A method and a device according to the the present invention may provide an improved procedure compared to the related art.

According to an example embodiment of the present invention, the method for analyzing a technical system that includes a first function and a second function, or for analyzing a technical process that includes a first function and a second function, provides that for the first function a first model is provided, and for the second function a second model is provided, the first model modeling a functional relationship of an input variable and an output variable of the first function as well as an influence of a first disturbance variable as a function of a first parameterization and as a function of a predefined, in particular learned, distribution over this first parameterization, the second model modeling a functional relationship of an input variable and an output variable of the second function as well as an influence of a second disturbance variable as a function of a second parameterization and as a function of a predefined, in particular learned, distribution over this second parameterization, an observation being provided that includes input variables and output variables of the first function and of the second function, a prediction regarding an effect of changing the first function under the influence of the first disturbance variable and/or changing the second function under the influence of the second disturbance variable being determined, and of these functions, that function whose change has a higher likelihood of achieving a desired effect, compared to changing the other of these functions, being selected. A more robust, explainable analysis is thus provided. In this way, a potential change in the system may be assessed merely within the created models without carrying out the change on the actual system.

It may be provided that the selected function is changed as a function of the parameterization of the model that models the selected function, or independently thereof.

According to an example embodiment of the present invention, it may be provided that the input variable of the first function is determined as a function of sensor signals, in particular of a sensor for detecting digital images, the input variable of the second function being determined as a function of the output variable of the first function, or that the input variable of the first function is determined as a function of a measured variable at an input of a first production cell of a production line and the output variable of the first function is determined as a function of a measured variable at an output of the first production cell, and the input variable of the second function is determined as a function of a measured variable at an input of a second production cell of the production line and the output variable of the second function is determined as a function of a measured variable at an output of the second production cell, the first production cell carrying out the first function and the second production cell carrying out the second function.

It may be provided that the output variable of the second function characterizes activation signals, in particular for a steering system.

According to an example embodiment of the present invention, it may be provided that the first function is selected, the first parameterization being determined as a function of a normal distribution, the first disturbance variable being generated as a function of the normal distribution, and the first function being changed as a function of the parameterization of the first model. Due to the learned distribution over the parameterization, in addition the analysis is more robust against inaccuracies in the modeling, compared to the method of Karimi et al.

According to an example embodiment of the present invention, it may be provided that the first function is selected, the second parameterization being determined as a function of a normal distribution, the second disturbance variable being determined as a function of a posterior distribution over the second disturbance variable, which estimates the causative second disturbance variable for the observation. The advantage of such an analysis is that it is adapted to a specific observation, and based on this observation predicts the effects of a change, and is thus easier for a system developer to understand.

It may be provided that the observation is provided in an iteration, and the selected function is changed as a function of this observation, an observation for a subsequent iteration being provided as a function of the changed function.

According to an example embodiment of the present invention, a device for analyzing a technical system that includes a first function and a second function, or for analyzing a technical process that includes a first function and a second function, provides that the device is designed to carry out the method.

According to an example embodiment of the present invention, it may be provided that the device includes at least one processor and at least one memory that are designed to carry out the method.

According to an example embodiment of the present invention, it may be provided that the device includes at least one interface that is designed to detect an observation of the first function or of the second function and to change the selected function.

According to an example embodiment of the present invention, a computer program includes computer-readable instructions, the method running when the computer-readable instructions are executed by a computer.

Further advantageous specific embodiments of the present invention are apparent from the following description and the figures.

DETAILED DESCRIPTION OF EXAMPLE EMBODIMENTS

The following disclosure relates to a device and to a method. The device and the method are designed to act on a technical system, the technical system being changed in order to make an effect of a determined observation conform as closely as possible to a desired observation.

Figure 1:
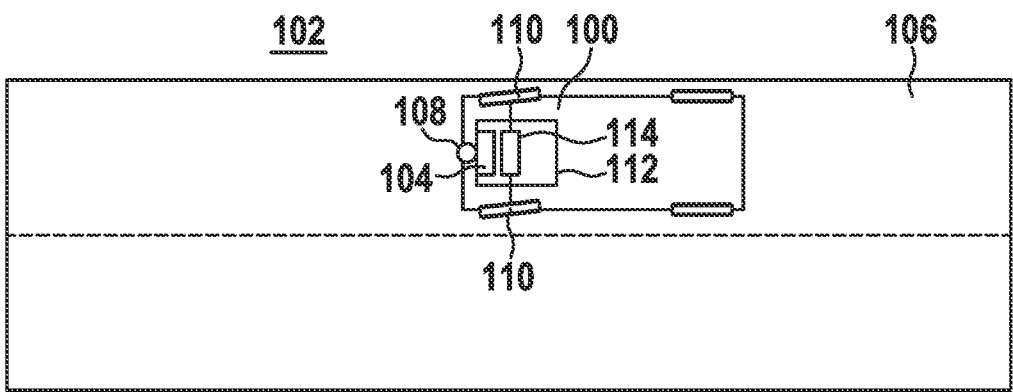
FIG. 1 shows a schematic illustration of a first specific embodiment of a technical system or a technical process, according to the present invention.

The device and the method are described below, on the one hand using the example of an error analysis for an at least semi-autonomous robot, in particular an at least semi-autonomous vehicle. Vehicle 100 is schematically illustrated in FIG. 1.

For example, an observation of a behavior of vehicle 100 and its surroundings 102 is made. In the example, it is established that the observation is unsatisfactory. For example, the behavior of vehicle 100 deviates from a desired behavior.

This is described below using the example of a lane-keeping assist function 104, which is designed to recognize, via a recognition, a lane 106 with the aid of sensor signals from at least one sensor 108, and by activating steerable wheels 110 of vehicle 100 with the aid of activation signals, to control vehicle 100 in such a way that vehicle 100 moves in lane 106. Lane-keeping assist function 104 is, for example, integrated into a control unit 112 that is designed to detect the sensor signals from sensor 108 and to output the activation signals for steering steerable wheels 110 to a steering system 114.

Sensor 108 is designed, for example, to detect a digital image, in particular a video image, radar image, LIDAR image, ultrasound image, or movement image (image of a movement). In the example, sensor 108 is situated at vehicle 100 in such a way that the image includes an area in front of vehicle 100.

A desired behavior of lane-keeping assist function 104 is, for example, that vehicle 100 moves in the middle of lane 106. A deviation from the desired behavior is present, for example, when vehicle 100 moves outside the middle of lane 106, for example leaves lane 106.

In this case, examples of possible improvements are a detection of lane 106 as a function of the sensor signals, or some other activation of steerable wheels 112 via the activation signals, without changing the detection of the lane.

Figure 2:
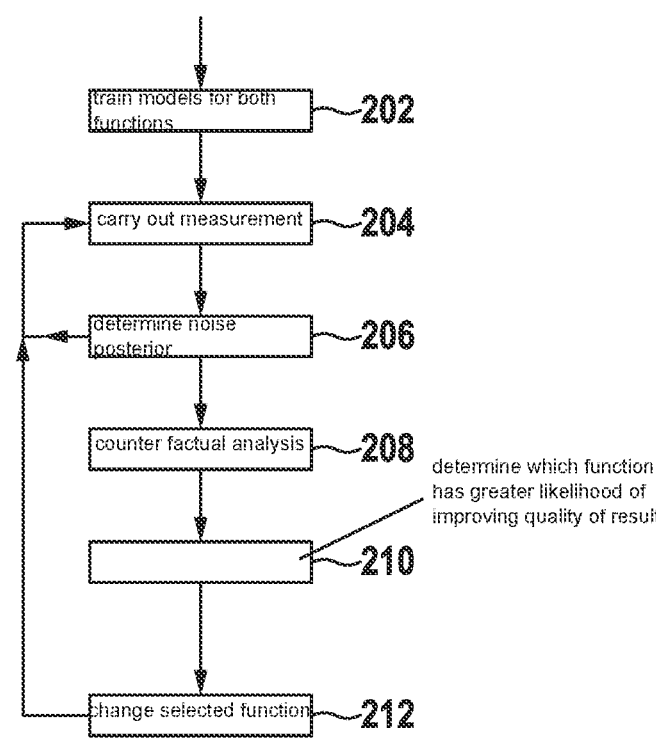
FIG. 2 shows steps in a first specific embodiment of a method for changing the technical system or the technical process, according to the present invention.

FIG. 2 illustrates a flowchart for the method in a design for error analysis of vehicle 100. Lane-keeping assist function 104 is used as an example.

The method is described below using the example of a first function, a second function, and a third function. In the example of lane-keeping assist function 104, the first function is the recognition. In the example of lane-keeping assist function 104, the second function is the activation. In the example of lane-keeping assist function 104, the third function is a translation of the activation signals into the sensor signals.

The first function, the second function, and the third function are in each case modeled as a model $$p(y|x) = \int p(y|f(x), \varepsilon, x, \varphi) p(f(x)|x, \varphi) p(\varepsilon|x, \varphi) p(\varphi) d\varepsilon df(x)$$

For each model, a functional relationship $f(x)$ of an input variable x and an output variable y and also an influence of a disturbance variable $\varepsilon$ are modeled as a function of a parameterization, i.e., as a function of a parameter set $\varphi$ in the example, and a distribution over the parameterization, a distribution $p(\varphi)$ over parameter set $\varphi$ in the example.

Models $p(y|x)$ for both functions are trained in a step 202. A step 204 is subsequently carried out.

A measurement is carried out, for example during travel of vehicle 100, in step 204. A specific measurement $x^F$, $y^F$ represents an observation that includes input variables $x^F$ and output variables $y^F$. Input variables $x^F$ include the input variable of the first function, the input variable of the second function, and the input variable of the third function. Output variables $y^F$ include the output variable of the first function, the output variable of the second function, and the output variable of the third function.

In the example, the sensor signals are the input variable of the first function. In the example, the input variable of the second function is the output variable of the first function. In the example, the activation signals are the output variable of the second function. In the example, the activation signals are the input variable of the third function. In the example, the sensor signals are the output variable of the third function.

In the example, the input variable and the output variable of the first function, of the second function, and of the third function are the observable state variable.

In addition, it may be provided that parameter values that are settable in the particular functions, for example a maximum torque that may be set using the activation signals, are to be incorporated as variables into input variables $x^F$.

Although the third function is modeled, in the example it is not subsequently changed, since such a change would alter surroundings 102 in which vehicle 100 is traveling. If such a change in surroundings 102 is possible, a change in the third function could likewise be provided. In the example, the third function is used to propagate the effects of the other two functions to one another.

It may be provided to determine, as a function of the measurement, whether or not the output variable of the second function brings about a good-quality result. The quality is determined, for example, by a measure that is defined as a function of values for inputs and outputs of the functions. The values are predefined in step 204 as a function of specific measurements $x^F, y^F$. It may be provided to repeat step 204 if the measurement indicates that the output variable of the second function brings about a good-quality result. In the example, a good-quality result is brought about when lane-keeping function 104 keeps vehicle 100 in the middle of lane 106. In the example, no adaptation is then necessary. Otherwise, it may be provided to carry out a step 206.

For each function, a noise posterior $p(\varepsilon|x^F, y^F, X, Y)$ is determined for the measurement in step 206.

Noise posterior $p(\varepsilon|x^F, y^F, X, Y)$ is a distribution over disturbance variable $\varepsilon$, which under the model assumption estimates which values of disturbance variable $\varepsilon$ have caused the specific measurement, i.e., which disturbance variable ε was necessary in order to translate inputs $x^F$ into specific value $y^F$.

A step 208 is subsequently carried out.

A counterfactual analysis is carried out in step 208.

With the counterfactual analysis, for each function a prediction is made regarding an effect of changes in one of the functions on the specific observation.

In the counterfactual analysis, for new inputs x* of the particular function that occur due to changes to the system, new output values y* for this function are generated which maintain the functional relationships of model p(y|x) for this function, and combine them with a disturbance variable ε|$x^F$, $y^F$, X, Y that is adapted to the observations.

For the first function, this combination results in a counterfactual model p(y|x, X, Y, $x^F$, $y^F$, 0), for the second function results in a counterfactual model p(y|x, X, Y,$x^F$, $y^F$, 1), and for the third function results in a counterfactual model p(y|x, X, Y, $x^F$, $y^F$, 2).

Pseudo-observations are generated using these counterfactual models.

For each function, a parameterization, i.e., a parameter set ϕ in the example, is initially generated according to the distribution over parameterizations of model p(y|x) for this function, i.e., in the example of distribution p(ϕ), is generated over parameter sets ϕ. It may be provided that distribution p(ϕ), the same as for the following example, is learned with the aid of an evidence lower bound (ELBO). In addition, the functional relationship with the output variable for the particular function is determined with the aid of conditional distribution p(f(x*)|x*, ϕ, X, Y) for new input value x*; i.e., a new value of output variable f(x*) is generated.

a. If the first function or the second function is to be changed, disturbance variable ε is generated for this purpose, according to N(0,σ), from model p(y|x) for this function. For the example of the lane assistant, in which specific changes are to be analyzed, for example a change is made in the input variable and the output variable of the particular model. In the example of the lane assistant, in which changes are to be directly assessed, it may be provided to set an output $y^{interv}$ instead of the new value of output variable f(x*). This output $y^{interv}$ defines new input value x* of a subsequent function, and in this example is used to determine the effects on these functions and possibly also the other subsequent functions. This means that when output $y^{interv}$ for the first function is set, the effect on the second function and possibly also on the third function is determined. This means that when output $y^{interv}$ for the second function is set, the effect on the third function and on the first function is determined.

b. If the function is not to be changed, disturbance variable ε is generated according to noise posterior p(ε|$x^F$, $y^F$, X, Y) that is determined for this function. In the example, new values for disturbance variable ε are generated as a function of this noise posterior p(ε|$x^F$, $y^F$, X, Y), using the following equation:

$$p(\varepsilon|x^F,y^F,X,Y)=\int\psi(\varepsilon;\mu_r,s_r)p(\phi|x^F,y^F,X,Y)d\phi$$

where ψ is the Gaussian density having the average value $$\mu_r=\sigma^2(k_\theta(x^F,x^F)+\sigma^2)^{-1}(g_\phi(y^F,x^F))$$

and the variance is $$s_r=\sigma^2(1-\sigma^2(k_\theta(x^F,x^F)+\sigma^2)^{-1})$$

for a certain parameter set ϕ. This means that average value $\mu_r$ and variance $s_r$ of a normal distribution are determined, which in turn are a function of the training data, the specific observation, and distribution p(ϕ|$x^F$, $y^F$,X,Y) over this parameter set ϕ. This means that an influence of disturbance variable ε is modeled as a function of a parameterization, parameter set ϕ in the example, and as a function of the distribution over this parameterization, distribution p(ϕ|$x^F$, $y^F$, X, Y) over parameter set ϕ in the example. The distribution, p(ϕ|$x^F$, $y^F$, X, Y) in the example, may be predefined or may be learned from training data. In the example, distribution p(ϕ|$x^F$, $y^F$, X, Y) is learned from the training data. The distribution models an uncertainty over this parameterization, over parameter set ϕ in the example. The following procedure is used in the example:

i. A posterior predictive covariance $k_\theta$($x^F$,$x^F$) of model p(y|x) is evaluated for this function. This results as a variance of conditional first distribution p(f($x^F$)|$x^F$, X,Y, ϕ) for observed value $x^F$, and is given by the following equation:

$$k_\theta(x^F,x^F)-K_\theta(x^F,x^F)-K_\theta(x^F,X)(K_\theta(X,X)+\sigma1)^{-1}K_\theta(X,x^F))$$

In the example, second functional relationship $g_\phi$($y^F$, $x^F$) for observed values $y^F$,$x^F$, and thus average value ur and variance $s_r$ of ψ(ε, $\mu_r$, $s_r$), are determined.

ii. For this function, a new disturbance variable ε is generated from a normal distribution having an average value $\mu_r$ and variance $s_r$.

c. New disturbance variable ε is combined with functional relationship f(x*) for new input value x* to form a new value of output variable y*=$g_\phi^{-1}$(f(x*)+ε,x*). $g_\phi^{-1}$ represents an inverse of a bijective second functional relationship $g_\phi$ between inputs x and outputs y of this function under the additive influence of disturbance variable ε on first functional relationship f(x).

This means that a result of the counterfactual analysis for the function includes a plurality of pseudo-observations.

A step 210 is subsequently carried out.

Depending on the result of the counterfactual analysis, i.e., as a function of the plurality of pseudo-observations, it is determined in step 210 which of the two functions, if it has been changed, has a greater likelihood of improving the quality of the result. In the example, the function having the greatest likelihood of improving the quality is determined. In the example of the lane assistant, it may be provided to test a plurality of possible changes or their quality, i.e., to simulate according to the algorithm, using explicit changes.

In the example, the pseudo-observations of particular counterfactual model p(y|x, X, Y, $x^F$, $y^F$, i) for i=0.1 are utilized to determine which of the functions, if it has been changed, has the greatest likelihood of improving the quality. The quality is computed, for example, using the measure as a function of each of the pseudo-observations of particular counterfactual model p(y|x, X, Y, $x^F$, $y^F$,i) for i=0.1.

For an existing pseudo-observation, for example the function which, of the functions, would bring about a quality improvement if it were carried out during normal operation is determined.

The potentially problematic function is identified by selecting that function, of the functions, that achieves the highest quality when it is changed.

In the example of the lane assistant, in which direct changes to the system are to be assessed, it is provided that the change that achieves the best quality is selected.

It may be provided to determine a plurality of pseudo-observations for various changes in the function, and to determine a particular measure for the quality as a function of these pseudo-observations. It may be provided to determine an average quality, i.e., an average value of the particular measures for the quality determined in each case for the plurality of pseudo-observations. It may be provided to determine which of the functions has the greatest likelihood of improving the average quality.

A step 212 is subsequently carried out. The selected function is changed in step 212 as a function of the parameterization of its model.

In the example of the lane assistant, in which direct changes to the system are to be implemented, it is provided that the selected change that achieves the best quality is applied. This means that the system is correspondingly changed.

Step 204 is subsequently carried out. The vehicle thus continues to be monitored.

In the example, it is identified whether the recognition or the activation is to be changed. In the example, it is thus identified which portion of lane-keeping function 104 is to be adapted.

In the counterfactual analysis, it may be provided to examine whether, as the result of a change in the first function or the second function, the observation would change the behavior. It would thus be established whether or not a change is to be assessed as promising.

It may be provided to propagate this change through the system, in each case using noise posterior $p(\varepsilon|x^F, y^F, X, Y)$. In this case, the effect of the change on the observation is analyzed.

Since the observation is known, and it is known whether the first function, for example the recognition, or the second function, for example the activation, is changed, the change and its effect are explainable.

In the example, the input variable of the first function, the state variable, and the output variable of the second function from the training data are predefined in a training phase. The output variable of the second function from the training data is the desired behavior for the input variable of the first function. The training data include in each case the input variable of the first function, and the state variable assigned to this input variable and the output variable of the second function assigned to this input variable, which are assigned to one another.

In the example, observed sensor signals are predefined as the input variable of the recognition, observed output values of the recognition are predefined as the input variable of the activation, and observed activation signals are predefined as the output variable of the activation, and also the state variable, observed for same, for a desired behavior of vehicle 100 is predefined. The output values of the recognition represent, for example, a representation of the perception of surroundings 102, for example lane boundaries on the left and right side of a roadway.

In the training phase, the model of the first function is trained as a function of the input variable of the first function and the state variable. In the training phase, the model of the second function is trained as a function of the state variable and the output variable of the second function. The model of the first function is trained to predict the state variable from the training data as accurately as possible. The model of the second function is trained to predict the output variable of the second model for the state variable from the training data as accurately as possible.

In the example, a model of recognition $p(y|x)$ is learned, where x is the input variable of the first function and y is the state variable. In the example, a model of activation $p(y|x)$ is learned, where x is the state variable and y is the output variable of the second function. In the example, a model of surroundings $p(y|x)$ is learned, where x is the state variable and y is the output variable of the third function. Model of recognition $p(y|x)$, model of activation $p(y|x)$, and model of surroundings $p(y|x)$ take into account the influence of particular random disturbance variable $\varepsilon$.

In an analysis phase, via possibly multiple random experiments for random disturbance variable $\varepsilon$, for each model or function a prediction is made for a certain observation regarding how the behavior of the output variable of the second function changes if either the first function or the second function has been changed.

In the analysis phase, the input variable of the first function is predefined from analysis data. The analysis data include in each case the input variable of the first function, and a reference for the state variable assigned to this input variable and a reference for the output variable of the second function assigned to this input variable, which are assigned to one another.

In the analysis phase, a modeled state variable is determined using the model of the first function, and a modeled output variable of the second function is determined using the model of the second function. As a function of a deviation of the modeled state variable from the reference for the state variable and as a function of a deviation of the modeled output variable from the reference for the output variable of the second function, either the first function or the second function is changed.

The observed sensor signals or the modeled state variables may include a distance, a speed, or an acceleration of a movement of vehicle 100.

The device and the method are described below, on the other hand, using the example of an error analysis for a production line 300.

Figure 3:
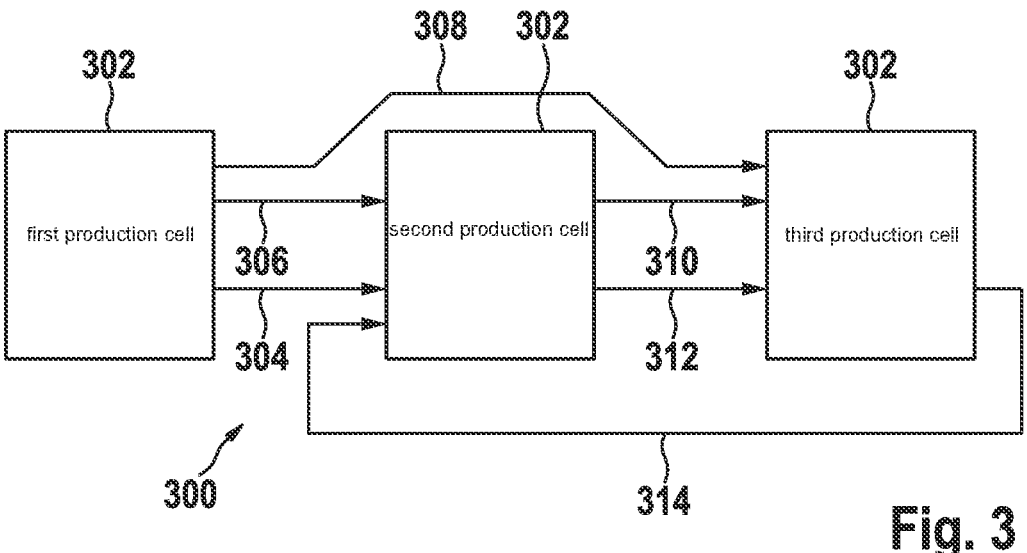
FIG. 3 shows a schematic illustration of a second specific embodiment of the technical system or the technical process, according to the present invention.

Production line 300 is schematically illustrated in FIG. 3.

Production line 300 in the example includes multiple production cells 302.

In the example, three production cells 302 are illustrated.

A first production cell 302 includes a first output variable 304 that represents an input variable for a second production cell 302. First production cell 302 includes a second output variable 306 that represents a different input variable for second production cell 302. First production cell 302 includes a third output variable 308, which is an input variable for a third production cell 302.

Second production cell 302 includes a first output variable 310 that represents an input variable for third production cell 302. Second production cell 302 includes a second output variable 312 that represents a different input variable for third production cell 302. Third production cell 302 includes an output variable 314, which is an input variable for second production cell 302.

Figure 4:
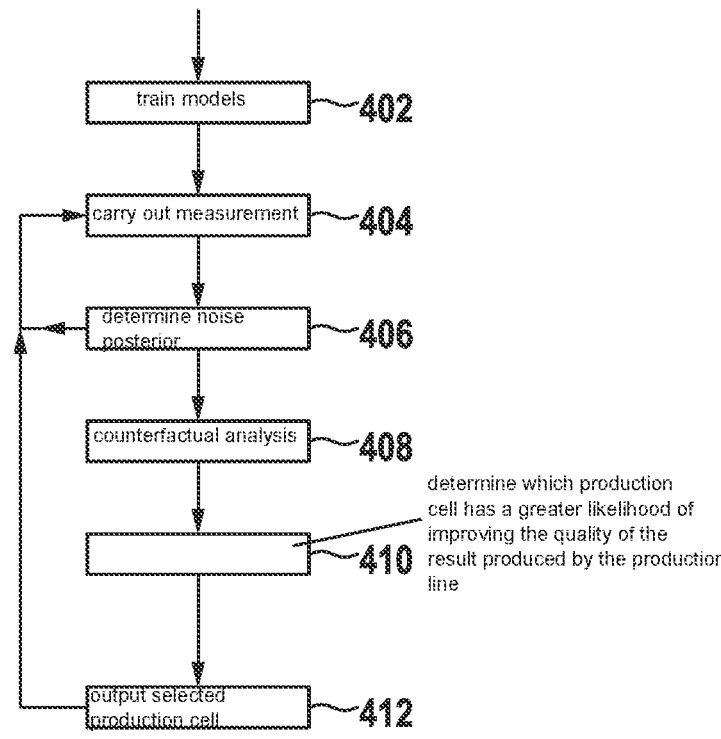
FIG. 4 shows steps in a second specific embodiment of the method, according to the present invention.

FIG. 4 illustrates a flowchart for the method in a design for error analysis of production line 300. The same as the situation described for the first function and the second function, production cells 302 represent various functions of production line 300.

For each production cell 302 of production line 300, a model $$p(y|x)=\int p(y|f(x),\varepsilon,x,\phi)p(f(x)|x,\phi)p(\varepsilon|x,\phi)p(\phi)d\varepsilon df(x)$$

is trained in a step 402. A training for one of production cells 302 of production line 300 is described below. For the other production cells 302 of production line 300, further models are trained in the same way in the example. It may also be provided to train the particular model in the method for only a portion of production cells 302 of production line 300, for example if models for another portion of production cells 302 of production line 300 that are already pretrained are provided.

Model p(y|x) includes a first distribution p(f(x)|x, $\phi$), where f(x) describes a first functional relationship between inputs x and outputs y of production cell 302, and f(x) is modeled using a Gaussian process. Model p(y|x) includes a second distribution p($\varepsilon$|x, $\phi$) which models an influence of a disturbance variable $\zeta$. Model p(y|x) includes a third distribution p($\phi$) that models an uncertainty over a parameterization, i.e., a parameter set $\phi$ in the example, of relationships between these distributions. Model p(y|x) includes a fourth distribution p(y|f(x), $\varepsilon$,x, $\phi$) which translates the functional relationship and the influence of the disturbance variable according to the parameterization, i.e., according to parameter set $\phi$ in the example, into observations of inputs x and outputs y.

Model p(y|x) is trained on predefined training data X,Y for inputs x and outputs y. For example, inputs x and outputs y for which production line 300 produces a good-quality result are used. Trained model p(y|x) represents normal operation.

The training of model p(y|x) includes determining the individual factors, i.e., of second distribution p($\varepsilon$|x, $\phi$) and of third distribution p($\phi$), these factors being conditional upon viewed training data X,Y. These distributions change as a result of this condition.

For first distribution p(f(x)|x, $\phi$), a conditional first distribution p(f(x)|x, $\phi$, X, Y) is determined in the training. For second distribution p($\varepsilon$|x, $\phi$), a conditional second distribution p($\varepsilon$|x, $\phi$, X, Y) is determined in the training. For third distribution p($\phi$), a conditional third distribution p($\phi$|X, Y) is determined in the training.

These conditional distributions may then be utilized for a prediction, using model p(y|x). The prediction may generate new values for outputs y, which are similar to training data X,Y.

It may be provided that distribution p($\phi$) is given by a normal distribution N(m,s), which is learned with the aid of the following equation:

$$\mathcal{L}(m, s, \theta) = E_{\{\phi \sim N(m,s)\}}[\log p(Y \mid X, \phi, \theta)] - KL[N(m, s) \| N(0.1))] \approx$$

$$\frac{1}{S}\sum_{i=1}[\log p(Y \mid X, \phi_i, \theta)] - KL[N(m, s) \| N(0.1)],$$

$$\log(Y \mid X, \phi_i, \theta) = \frac{1}{2}\log(\det(k_\theta(X, X) + \sigma I)) +$$

$$\frac{1}{2}\big(g_{\phi_i}(Y) - \mu(X)\big)^T (k_\theta(X, X) + \sigma I)^{-1}\big(g_{\phi_i}(Y) - \mu(X)\big) -$$

$$\sum_n \log\left(\left|\frac{\partial g_\phi}{\partial y}(Y_n)\right|\right) + \frac{N}{2}\log(2\pi)$$

10

This equation is referred to as evidence lower bound (ELBO). In the example, conditional first distribution p(f(x) |x, $\phi$, X, Y) is given by a posterior predictive distribution of a Gaussian process.

In the example, conditional second distribution p($\varepsilon$|x, $\phi$, X, Y)=N(0, $\sigma$) is normally distributed. In the example, its variance $\sigma$ is determined by optimizing the ELBO.

In the example, fourth distribution p(y|f(x), $\varepsilon$, x, $\phi$) results from a model assumption having a fifth distribution:

$$p(y|f(x),\varepsilon,x,\phi)=\delta(g_\phi^{-1}(f(x)+\varepsilon,x))$$

where $g_\phi^{-1}$ represents an inverse of a bijective second functional relationship $g_\phi$ between inputs x and outputs y of production cell 302 under the additive influence of disturbance variable $\varepsilon$ on first functional relationship f(x). This means that in the model assumption, this relationship between functional relationship (f(x)), disturbance variable $\varepsilon$, and parameterized transformation $g_\phi$ is postulated for the observations. Reference symbol $\delta$ here denotes the Dirac distribution; i.e., the values of y that do not correspond to $g^{-1}_\phi(f(x)+\varepsilon)$ are excluded.

A step 404 is subsequently carried out.

A measurement is carried out, for example, in step 404 during production using production line 300; i.e., specific measurements $x^F$, $y^F$ for the inputs and outputs of production cells 302 are present for which a model p(y|x) is provided.

In the example illustrated in FIG. 3, in the measurement, for example first output variable 304, second output variable 306, and third output variable 308 of the first production cell, first output variable 310 and second output variable 312 of the second production cell, and output variable 314 of the third production cell are detected. Thus, the respective input variables are also detected in the example.

It may be provided as a function of the measurement to determine whether or not production line 300 produces a good-quality result. The quality is determined, for example, using a measure that is defined as a function of values for inputs and outputs of production cells 302. The values are predefined in step 404 as a function of specific measurements $x^F$,$y^F$. It may be provided to repeat step 404 if the measurement indicates that production line 300 produces a good-quality result. In the example, no adaptation is then necessary. Otherwise, it may be provided to carry out a step 406.

A noise posterior p($\varepsilon$|$x^F$, $y^F$, X, Y) is determined in step 406 for the measurement for each production cell 302 of production line 300 for which a model p(y|x) is provided.

This noise posterior p($\varepsilon$|$x^F$, $y^F$, X, Y), due to conditioning on measured values from the measurement, is no longer necessarily distributed around 0.

Noise posterior p($\varepsilon$|$x^F$, $y^F$, X, Y) is a distribution over disturbance variable $\varepsilon$, which under the model assumption estimates which values of disturbance variable $\varepsilon$ have caused the specific measurement, i.e., which disturbance variable $\varepsilon$ was necessary in order to translate inputs $x^F$ into specific value $y^F$.

It may be provided to determine noise posterior p($\varepsilon$|$x^F$, $y^F$, X, Y) for a subset of production cells 302 of production line 300.

A step 408 is subsequently carried out.

A counterfactual analysis is carried out in step 408.

For each production cell 302 of production line 300 for which a model p(y|x) is provided, noise posterior p($\varepsilon$|$x^F$, $y^F$, X, Y) provided for same is adapted to specific observations from the measurement.

With the counterfactual analysis, for each production cell 302 of production line 300 for which a model p(y|x) is provided, a prediction is made regarding an effect of changes in a production cell 302 of production line 300 on the specific observation.

In the counterfactual analysis, for new inputs x* at a particular production cell 302 that occur due to changes to the system, new output values y* for this production cell 302 are generated which maintain the functional relationships of model p(y|x) for this production cell 302, and combine them with a disturbance variable $\varepsilon|x^F$, $y^F$, X, Y that is adapted to the observations.

This combination results in a counterfactual model p(y|x, X, Y,$x^F$, $y^F$, i) for this production cell 302. Index i indicates which production cell 302 is to be changed.

This means that a counterfactual model p(y|x, X, Y, $x^F$, $y^F$, i) is created for at least one production cell 302 that is to be changed, and for the other of i production cells 302 that are not to be directly changed. The changes in the at least one production cell 302 propagate to the other production cells due to changed outputs. This means that the respective inputs of the other production cells may possibly change.

It may be provided that for at least one production cell 302 of production line 300, its outputs are analytically determinable, i.e., without a noise posterior. In this case, its output is analytically determined, and noise posterior p($\varepsilon|x^F$, $y^F$, X, Y) is determined for the subset of production cells 302 of production line 300.

It may be provided to determine counterfactual model p(y|x, X, Y, $x^F$, $y^F$, i) for production cells 302 for which noise posterior p($\varepsilon|x^F$, $y^F$, X, Y) is determined, or for the subset of these production cells 302.

A change here means that instead of the disturbance variable influence that is part of specific observation $x^F$,$y^F$, an effect of a disturbance variable influence of model p(y|x) is determined for this production cell 302.

A counterfactual model p(y|x, X, Y, $x^F$, $y^F$, i) for i production cells 302 of the production line represents a model in which pseudo-observations are generated in the example. For this purpose, the following algorithm is carried out in order to propagate effects of changes in one production cell 302 to other production cells 302:

A first production cell 302 is characterized in that none of other production cells 302 of production line 300 possess an output which is an input for first production cell 302. This means that for first production cell 302, in the example no input value x is provided. If first production cell 302 is to be changed, a new output value y* is provided for first production cell 302.

For a production cell 302, a new input value x* is available when there is a production cell 302 for which a new output value y* is provided which defines new input value x* of this production cell 302. New output value y* is generated, using counterfactual model p(y|x, X, Y, $x^F$, $y^F$, i) for a production cell 302, as a function of whether or not the present cell is to be changed, as described below for one of these production cells 302.

For production cell 302, a parameterization, i.e., a parameter set $\phi$ in the example, is initially generated according to learned distribution q($\phi$) over parameterizations of model (y|x) for this production cell 302. In addition, the functional relationship with the output variable for this production cell 302 is determined with the aid of conditional first distribution p(f(x*)|x*, $\phi$, X, Y) for new input value x*; i.e., a new value of output variable f(x*) is generated. For first production cell 302, in the example there is no input value x, i.e., also no new input value x*. In this case, the input value is set to x*=1.

a. If this production cell 302 is to be changed, disturbance variable $\varepsilon$ is generated according to N(0,$\sigma$) from model p(y|x) for this production cell 302.

b. If this production cell 302 is not to be changed, disturbance variable $\varepsilon$ is generated according to noise posterior p($\varepsilon|x^F$, $y^F$, X, Y) that is determined for this production cell 302. In the example, new values are generated for disturbance variable $\varepsilon$ as a function of this noise posterior p($\varepsilon|x^F$, $y^F$, X, Y), using the following equation:

$$p(E|x^F,y^F,X,Y)=\int\psi(\varepsilon;\mu_r,s_r)p(\phi|x^F,y^F,X,Y)d\phi$$

where $\psi$ is the Gaussian density having the average value $$\mu_r=\sigma^2(k_\theta(x^F,x^F)+\sigma^2)^{-1}(g_\phi(y^F,x^F))$$

and the variance is $$s_r=\sigma^2(I-\sigma^2(k_\theta(x^F,x^F)+\sigma^2)^{-1})$$

for a certain parameter set $\phi$. This means that average value $\mu_r$ and variance $s_r$ of a normal distribution are determined, which in turn are a function of the training data, the specific observation, and distribution p($\phi|x^F$, $y^F$,X, Y) over this parameter set $\phi$. This means that an influence of disturbance variable $\varepsilon$ is modeled as a function of a parameterization, parameter set $\phi$ in the example, and as a function of distribution p($\phi|x^F$, $y^F$, X, Y) over this parameterization, over parameter set $\phi$ in the example. Distribution p($\phi|x^F$, $y^F$, X, Y) may be predefined or learned. In the example, distribution p($\phi|x^F$, $y^F$, X, Y) is learned from the training data. The distribution models an uncertainty over this parameterization, over parameter set $\phi$ in the example. The following procedure is used in the example:

i. A posterior predictive covariance $k_\theta(x^F,x^F)$ of model p(y|x) is evaluated for this production cell 302. This results as a variance of conditional first distribution p(f($x^F$)|$x^F$, X, Y, $\phi$) for observed value $x^F$, and is given by the following equation:

$$k_{74}(x^F,x^F)=K_{74}(x^F,x^F)-K_{74}(x^F,X)(K_{74}(X,X)+\sigma)^{-1}K_\theta(X,x^F))$$

In the example, second functional relationship $g_\phi(y^F$, $x^F$) for observed values $y^F$, $x^F$, and thus average value $\mu_r$ and variance $s_r$ of $\psi(\varepsilon, \mu_r, s_r)$, are determined.

ii. For this production cell 302, a new disturbance variable $\varepsilon$ is generated from a normal distribution having an average value $\mu_r$ and variance $s_r$.

c. New disturbance variable $\varepsilon$ is combined with functional relationship f(x*) for new input value x* to form a new value of output variable y*=$g_\phi^{-1}$(f(x*)+$\varepsilon$, x*).

This means that a result of the counterfactual analysis for production cells 302 includes a plurality of pseudo-observations.

A step 410 is subsequently carried out.

Depending on the result of the counterfactual analysis, i.e., as a function of the plurality of pseudo-observations, it is determined in step 410 which production cell 302, if it has been changed, has a greater likelihood of improving the quality of the result produced by production line 300, compared to some other production cell 302. In the example, production cell 302 having the greatest likelihood of improving the quality is determined.

In the example, the pseudo-observations of counterfactual model p(y|x, X, Y, $x^F$, $y^F$,i) are utilized to determine which production cell 302, if it has been changed, has the greatest likelihood of improving the quality. The quality is determined, for example, using the measure that is defined as a function of values for inputs and outputs of production cells 302. The values are computed in step 410 as a function of each of the pseudo-observations of counterfactual model p(y|x, X, Y,$x^F$, $y^F$, i).

For an existing pseudo-observation, for example production cell 302 that would bring about a quality improvement if it were carried out during normal operation is determined. Potentially problematic production cell 302 is identified by selecting that production cell 302 that achieves the highest quality when it is changed.

It may be provided to determine a plurality of pseudo-observations for various changes in same production cell 302, and to determine a particular measure for the quality as a function of these pseudo-observations. It may be provided to determine an average quality, i.e., an average value of the particular measures for the quality that are determined in each case for the plurality of pseudo-observations. It may be provided to determine production cell 302 having the greatest likelihood of improving the average quality.

A step 412 is subsequently carried out. Selected production cell 302 is output in step 412.

Step 404 is subsequently carried out in the example. Production line 300 thus continues to be monitored. It may also be provided to terminate the method.

Parameterization φ does not necessarily have to correlate with the parameterization of physical production cell 302. By use of the described procedure, it is identified whether a production cell 302 is to be changed. The change refers to a present operation of production cell 302 being replaced by its normal operation. In this example, it is not determined how the hardware of production cell 302 or its control is to be changed.

Figure 5:
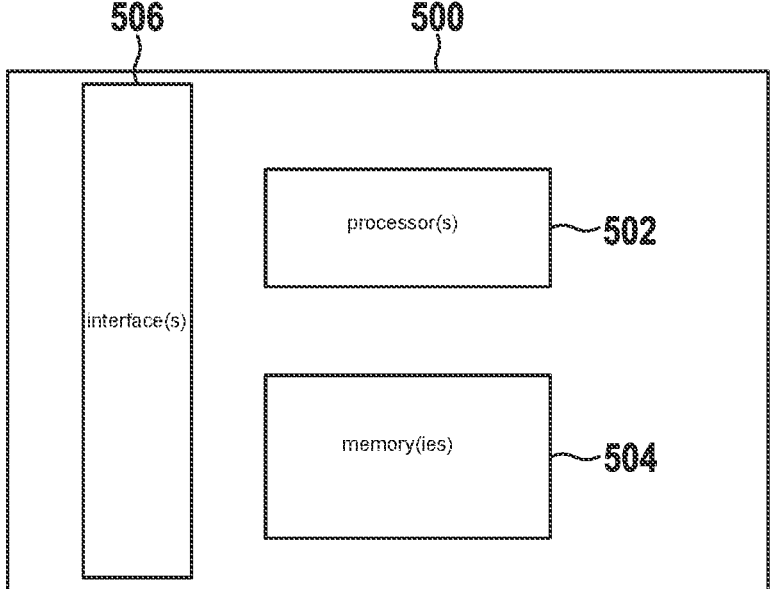
FIG. 5 shows a device for changing the technical system or the technical process, according to an example embodiment the present invention.

FIG. 5 schematically illustrates a device 500 for changing the technical system, which includes the first function and the second function, or for changing the technical process that includes the first function and the second function. Device 500 is designed to carry out the method according to the present invention. In the example, device 500 includes at least one processor 502 and at least one memory 504 that are designed to carry out the method. In the example, device 500 includes at least one interface 506 that is designed to detect the observation of the first function or the second function and to change the selected function.

For vehicle 100, device 500 is designed, for example, to detect the sensor signals as an observation and to change the activation signals.

For production line 300, device 500 is designed, for example, to detect the input variables and output variables of production cells 302 as an observation and to change one of production cells 302.

The method and device 500 are not limited to either the observation of two functions, or to the selection of the function to be changed from these two functions. Rather, an arbitrary number of functions may be modeled by models, and the function to be changed may be selected from these models.

What is claimed is:

1. A method for operating a vehicle comprising an automated driving system, the method comprising:

conducting an automated driving control of the vehicle by a control system that executes a plurality of functions for guiding the vehicle along a path;

during the automated driving control of the vehicle, obtaining, by a processing system that includes one or more processors, real-time sensor data from a sensor system of the vehicle, the sensor data comprising information characterizing an environment of the vehicle and/or one or more operating states of vehicle components or subsystems;

analyzing, by the control system, the real-time sensor data to determine a current observation that includes input variables and output variables of a first function and of a second function, wherein:

the first function comprises a perception function of the control system, and the second function comprises a control or actuation function of the control system; and the analyzing is a model-based analysis in which:

a first model is provided for the first function, and a second model is provided for the second function;

the first model models a functional relationship between an input variable and an output variable of the first function and an influence of a first disturbance variable as a function of a first parameterization and as a function of a predefined learned distribution over the first parameterization; and the second model models a functional relationship between an input variable and an output variable of the second function and an influence of a second disturbance variable as a function of a second parameterization and as a function of a predefined learned distribution over the second parameterization;

using, by the processing system, the first and second models and the current observation to determine a prediction regarding an effect of: i) changing the first function under the influence of the first disturbance variable, and/or ii) changing the second function under the influence of the second disturbance variable;

selecting, by the processing system and based on the prediction, whichever one of the first and second functions has been predicted, by the prediction, to have a higher likelihood of achieving a desired effect in operation of the vehicle, compared to the change of another one of the first function and second functions; and updating, by the processing system, the selected one of the first and second functions, during continued automated driving control of the vehicle, by modifying one or more operating parameters of the selected function based on the respective one of the parameterizations of the respective one of the models that is associated with the selected one of the first and second functions, thereby altering a behavior of the selected function in real-time operation;

wherein the method is performed as part of a closed-loop process that occurs during driving operation of the vehicle, such that the continued automated driving control of the vehicle is influenced by successive updates to the selected one of the first and second functions based on the real-time sensor data and model-based analysis.

2. The method as recited in claim 1, wherein:

the input variable of the first function is determined as a function of sensor signals of a sensor for detecting digital images; and the input variable of the second function is determined as a function of the output variable of the first function.

3. The method as recited in claim 1, wherein the output variable of the second function characterizes activation signals for a steering system.

4. The method as recited in claim 1, wherein the first function is selected, the first parameterization being determined as a function of a normal distribution, the first disturbance variable being generated as a function of the normal distribution, and the first function being changed as a function of the parameterization of the first model.

5. The method as recited in claim 1, wherein the first function is selected, the second parameterization being determined as a function of a normal distribution, the second disturbance variable being determined as a function of a posterior distribution over the second disturbance variable, which estimates the causative second disturbance variable for the observation.

6. The method as recited in claim 1, wherein the closed-loop process is composed of a plurality of iterations during the continued automated driving control of the vehicle, such that each new observation is based on updated real-time sensor data reflecting effects of a previously selected and updated function.

7. A vehicle control system for automated driving control, the vehicle control system comprising:
  a sensor system; and
  a processing system that includes one or more processors; wherein:
    the processing system is configured to:
      conduct automated driving control of the vehicle by executing a plurality of functions for guiding the vehicle along a path;
      during the automated driving control of the vehicle, obtain real-time sensor data from the sensor system, the sensor data comprising information characterizing an environment of the vehicle and/or one or more operating states of vehicle components or subsystems; and
      analyze the real-time sensor data to determine a current observation that includes input variables and output variables of a first function and of a second function, the first function comprises a perception function of the control system, and the second function comprises a control or actuation function of the control system;
    the analysis is a model-based analysis in which:
      a first model is provided for the first function, and a second model is provided for the second function;
      the first model models a functional relationship between an input variable and an output variable of the first function and an influence of a first disturbance variable as a function of a first parameterization and as a function of a predefined learned distribution over the first parameterization; and
      the second model models a functional relationship between an input variable and an output variable of the second function and an influence of a second disturbance variable as a function of a second parameterization and as a function of a predefined learned distribution over the second parameterization;
    the processing system is configured to:
      use the first and second models and the current observation to determine a prediction regarding an effect of: i) changing the first function under the influence of the first disturbance variable, and/or ii) changing the second function under the influence of the second disturbance variable;
    select, based on the prediction, whichever one of the first and second functions has been predicted, by the prediction, to have a higher likelihood of achieving a desired effect in operation of the vehicle, compared to the change of another one of the first function and second functions; and
    update the selected one of the first and second functions, during continued automated driving control of the vehicle, by modifying one or more operating parameters of the selected function based on the respective one of the parameterizations of the respective one of the models that is associated with the selected one of the first and second functions, thereby altering a behavior of the selected function in real-time operation; and
  the processing system is configured to perform the obtainment of the real-time sensor data, the analysis, the prediction determination, the selection, and the update as part of a closed-loop process that occurs during driving operation of the vehicle, such that the continued automated driving control of the vehicle is influenced by successive updates to the selected one of the first and second functions based on the real-time sensor data and model-based analysis.

8. A non-transitory computer-readable medium on which is stored a computer program including computer-readable instructions that are executable by a processing system of a vehicle for controlling automated driving operations of the vehicle, the instructions, when executed by the processing system, causing the processing system to perform a method, the method comprising:
  conducting automated driving control of the vehicle by executing a plurality of functions for guiding the vehicle along a path;
  during the automated driving control of the vehicle, obtaining real-time sensor data from a sensor system of the vehicle, the sensor data comprising information characterizing an environment of the vehicle and/or one or more operating states of vehicle components or subsystems;
  analyzing the real-time sensor data to determine a current observation that includes input variables and output variables of a first function and of a second function, wherein:
    the first function comprises a perception function of the control system, and the second function comprises a control or actuation function of the control system; and
    the analyzing is a model-based analysis in which:
      a first model is provided for the first function, and a second model is provided for the second function;
      the first model models a functional relationship between an input variable and an output variable of the first function and an influence of a first disturbance variable as a function of a first parameterization and as a function of a predefined learned distribution over the first parameterization; and
      the second model models a functional relationship between an input variable and an output variable of the second function and an influence of a second disturbance variable as a function of a second parameterization and as a function of a predefined learned distribution over the second parameterization;

using the first and second models and the current observation to determine a prediction regarding an effect of: i) changing the first function under the influence of the first disturbance variable, and/or ii) changing the second function under the influence of the second disturbance variable;

selecting, based on the prediction, whichever one of the first and second functions has been predicted, by the prediction, to have a higher likelihood of achieving a desired effect in operation of the vehicle, compared to the change of another one of the first function and second functions; and updating the selected one of the first and second functions, during continued automated driving control of the vehicle, by modifying one or more operating parameters of the selected function based on the respective one of the parameterizations of the respective one of the models that is associated with the selected one of the first and second functions, thereby altering a behavior of the selected function in real-time operation;

wherein the method is performed as part of a closed-loop process that occurs during driving operation of the vehicle, such that the continued automated driving control of the vehicle is influenced by successive updates to the selected one of the first and second functions based on the real-time sensor data and model-based analysis.

9. A method for operating a manufacturing plant comprising a plurality of production cells configured to carry out respective manufacturing functions, the method comprising:

conducting an automated operation of the manufacturing plant by a control system that executes a plurality of functions for managing the manufacturing functions performed by the production cells;

during the automated operation of the manufacturing plant, obtaining, by a processing system that includes one or more processors, real-time sensor data from a sensor system of the manufacturing plant, the sensor data comprising information characterizing the plant;

analyzing, by the control system, the real-time sensor data to determine a current observation that includes input variables and output variables of a first function and of a second function, wherein:

the first function comprises a monitoring or quality control function applied to a first production cell, and the second function comprises a control or actuation function applied to a second production cell; and the analyzing is a model-based analysis in which:

a first model is provided for the first function, and a second model is provided for the second function;

the first model models a functional relationship between an input variable and an output variable of the first function and an influence of a first disturbance variable as a function of a first parameterization and as a function of a predefined learned distribution over the first parameterization; and the second model models a functional relationship between an input variable and an output variable of the second function and an influence of a second disturbance variable as a function of a second parameterization and as a function of a predefined learned distribution over the second parameterization;

using, by the processing system, the first and second models and the current observation to determine a prediction regarding an effect of: i) changing the first function under the influence of the first disturbance variable, and/or ii) changing the second function under the influence of the second disturbance variable;

selecting, by the processing system and based on the prediction, whichever one of the first and second functions has been predicted, by the prediction, to have a higher likelihood of achieving a desired effect in operation of the manufacturing plant, compared to the change of another one of the first function and second functions; and updating, by the processing system, the selected one of the first and second functions, during continued automated operation of the manufacturing plant, by modifying one or more operating parameters of the selected function based on the respective one of the parameterizations of the respective one of the models that is associated with the selected one of the first and second functions, thereby altering a behavior of the selected function in real-time operation;

wherein the method is performed as part of a closed-loop process that occurs during operation of the manufacturing plant, such that the continued automated operation of the plant is influenced by successive updates to the selected one of the first and second functions based on the real-time sensor data and model-based analysis, thereby affecting characteristics of products produced by the manufacturing plant.

10. The method as recited in claim 9, wherein:

the input variable of the first function is determined as a function of a measured variable at an input of a first production cell of a production line;

the output variable of the first function is determined as a function of a measured variable at an output of the first production cell;

the input variable of the second function is determined as a function of a measured variable at an input of a second production cell of the production line;

the output variable of the second function is determined as a function of a measured variable at an output of the second production cell; and the first production cell carries out the first function and the second production cell carrying out the second function.

* * * * *